United States Patent [19]

Inoue

[11] Patent Number: 4,866,537
[45] Date of Patent: Sep. 12, 1989

[54] IMAGE PRINTING MACHINE

[75] Inventor: Yoshinobu Inoue, Yamatokoriyama, Japan

[73] Assignee: Sharp Kabushiki Kaisha, Osaka, Japan

[21] Appl. No.: 102,614

[22] Filed: Sep. 30, 1987

[30] Foreign Application Priority Data

Sep. 30, 1986 [JP] Japan .................................. 61-233860
Sep. 30, 1986 [JP] Japan .................................. 61-233861

[51] Int. Cl.⁴ .............................................. H04N 1/21
[52] U.S. Cl. .................................... 358/296; 358/474
[58] Field of Search ............... 358/256, 285, 286, 293, 358/294, 296

[56] References Cited

U.S. PATENT DOCUMENTS 4,523,235 6/1985 Rajchman ........................... 358/293
4,623,935 11/1986 Mukai et al. .
4,717,965 1/1988 Mashiko et al. ..................... 358/294

FOREIGN PATENT DOCUMENTS 0177372 4/1986 European Pat. Off. .
2063005 5/1981 United Kingdom .
2088671 6/1982 United Kingdom .
2109192 5/1983 United Kingdom .
2115634 9/1983 United Kingdom .
2131251 6/1984 United Kingdom .
2152325 7/1985 United Kingdom .
2155272 9/1985 United Kingdom .

Primary Examiner—E. A. Goldberg
Assistant Examiner—Lincoln Donovan
Attorney, Agent, or Firm—Birch, Stewart, Kolasch & Birch

[57] ABSTRACT

An image printing machine is arranged whereby unnecessary image information, although it is read out by an image scanner, is automatically deleted so as not to be printed on a printing paper. Moreover, the printing position of the read-out image information printed by the image printing machine on the printing paper can be advantageously changed in accordance with the number of times of the image reading.

5 Claims, 5 Drawing Sheets

Fig. 9          ABCDEFGHIJKLMNOPQRS

IMAGE PRINTING MACHINE

BACKGROUND OF THE INVENTION

1. Field of the Invention

The present invention relates to an image printing machine which is arranged to print information on print paper of an image (character, symbol, drawing, etc.) read from a newspaper, magazine, textbook or reference book, etc. by the use of an image scanner, whereby unnecessary image information read by the image scanner is deleted so as not to be printed.

Moreover, the present invention further relates to an image printing machine of the type described above which is so arranged that the printing position on the print paper where the image information is printed is changed corresponding to the number of times of image reading by the image scanner. For example, when a wordbook is read, an English word is printed at the left side of the print paper, while its Japanese translation is printed at the right side of the paper. Or, in reading a price list, it is possible according to the image printing machine of the present invention that a model name is printed at the left side of the paper, with its corresponding price being printed at the right side of the paper.

2. Description of the Prior Art

In a conventional image reading and printing machine, the read-out image information is printed on the printing paper from the start point which is positioned at one side of the printing paper, and the image information exceeding one line is printed again from the start point of a next line on the paper. Accordingly, the start point has always been at the same position in each line according to the conventional image reading and printing machine.

Therefore, it has been difficult to print the image information in a distinguishing manner on the paper to make a pair, for example, a word and its translated word, or a model name and its price, resulting in a hard-to-see, poor appearance of the printed image information.

As shown in FIG. 8, the image scanner referred to above is in the shape of a pen, which has a reader part 7 provided at the bottom surface thereof. The reader part 7 will be in contact with the paper for reading the image on the paper. A pitch sensor 8 of a rotary encoder type which rotates when the image scanner moves on the paper is also provided for measuring the amount the scanner move. In this case, the reader part 7 has a length a of 8 mm, and the bottom of the image scanner has a length b of 26 mm and a width c of 17 mm.

When an operator of the machine reads a desired image by the use of the image scanner, the image (for example, a character) which is being traced by the image scanner is not the image that the operator looks at. There is a difference between the image being traced at the image scanner and that being looked at by the operator.

As a result, when reading is finished, an unnecessary image, in addition to the desired image, is inevitably read out. By way of one example, in the case where an image shown in FIG. 9 is described on the paper, and only "A" to "O" should be read out, the bottom surface of the image scanner is pressed into contact with the paper, and then the image scanner is moved in a direction shown by an arrow in FIG. 10. The position of the image scanner when image reading is started, when image reading is being carried out and when image reading is completed is respectively shown in FIG. 11, FIG. 12 and FIG. 13.

As is clear from FIGS. 11-13, even if the image scanner is stopped as soon as the operator looks at the character "O", the image scanner has actually already read out the character "P". Therefore, when the read-out image information is printed as it is, the characters "A" to "P" are undesirably printed.

SUMMARY OF THE INVENTION

The present invention has for its essential object to provide an image printing machine which is arranged to automatically delete a specified length (fixed length) of the image information which has been read out by an image scanner when image reading is finished, so that unnecessary image information other than the desired image information is not printed.

A further object of the present invention is to provide an image printing machine of the above-described type which is provided with a means to change the printing position on a paper where the read-out image information is printed in accordance with the number of times of image reading by the image scanner, so that the image information can be printed in an easy-to-see manner.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become apparent from the following description taken in conjunction with one preferred embodiment thereof with reference to the accompanying drawings which are given by way of illustration only, and thus, are not limitative of the present invention, and in which:

FIG. 9 is a view of characters to be read out by the image scanner of FIG. 8;

DETAILED DESCRIPTION OF THE INVENTION

Figure 1:
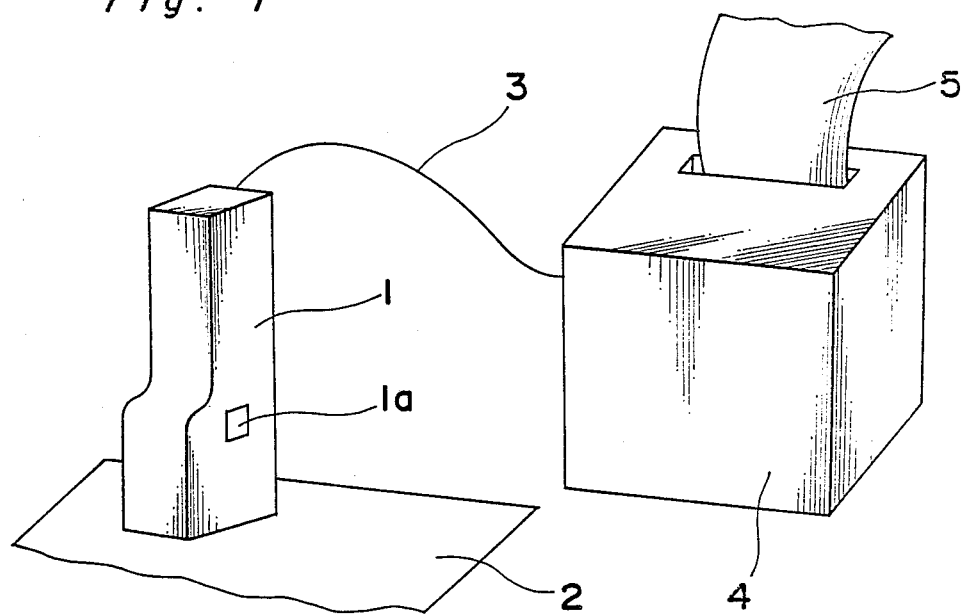
FIG. 1 is a perspective view of an image reading and printing machine according to one preferred embodiment of the present invention.

Before the description of the present invention proceeds, it is to be noted that like parts are designated by like reference numerals throughout the accompanying drawings.

Referring to FIG. 1, there is shown an image scanner 1 which is slidably moved on paper 2 so as to read out an image on the paper.

An image information (data) read out by the image scanner 1 is transmitted to a main body 4 by way of a line 3. The main body 4 prints the transmitted image information onto a printing paper (roll paper) 5.

As described above, the image information in the desired area of the paper 2 can be printed on a printing paper 5 when an operator of the machine traces the desired area by the image scanner 1.

The image scanner 1 is provided with a key 1a which is depressed when the image scanner reads out the image. As the image scanner 1 is moved on the paper 2 while the key 1a is depressed, the image on the paper 2 is read out.

Figure 2:
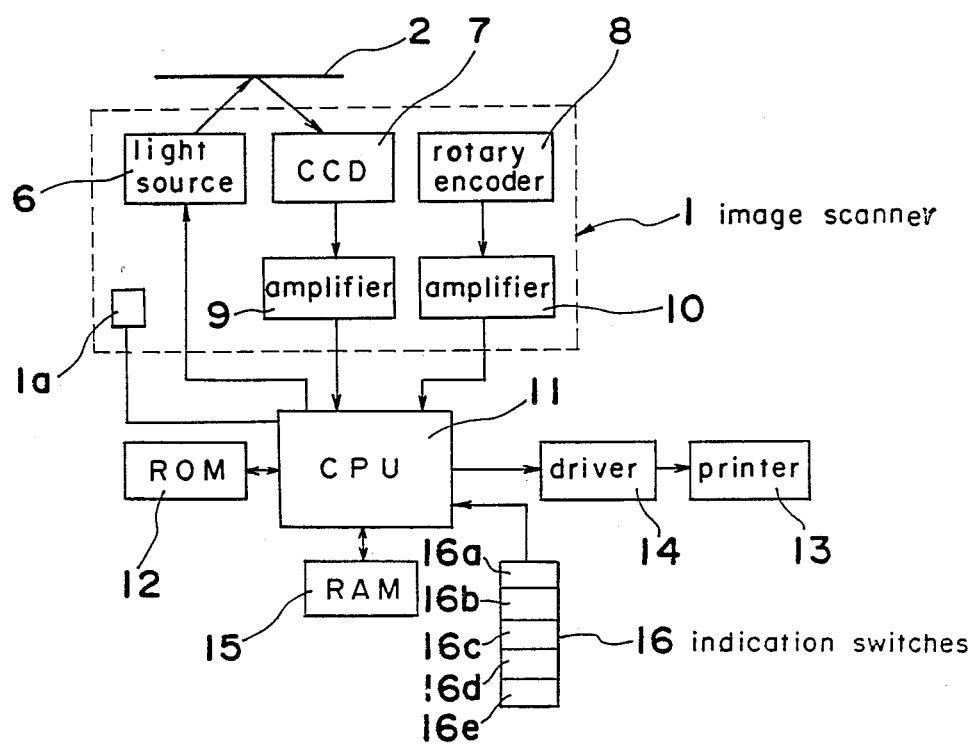
FIG. 2 is a block diagram showing the structure of the image printing machine of FIG. 1.

FIG. 2 is a block diagram showing the inside of the image printing machine.

In FIG. 2, parts encircled by a broken line are provided inside the image scanner 1, and the other parts are accommodated inside the main body 4.

The image scanner 1 is comprised of a light source 6 aligned with LEDs, an element 7 which employs a CCD so as to read light and shade of the paper, and a rotary encoder 8. The light source 6 irradiates light over the paper 2. If an image is formed on the paper 2, the irradiated light is not reflected. On the contrary, without an image on the paper 2, the irradiated light is reflected. Therefore, the element 7 is provided so as to detect the absence or the presence of the irradiated light. That is, element 7 detects whether it is bright owing to the presence of the irradiated light or it is dark owing to a lack of the irradiated light, so that the image can be grasped.

The rotary encoder 8 provided in the image scanner 1 detects the rotary movement of a member (not shown) which is rotated by slidable movement of the image scanner 1 on the paper 2. The rotary encoder 8 measures the distance of movement of the image scanner 1 on the paper 2.

An output of each of the element 7 and the rotary encoder 8 is respectively inputted to CPU 11 through an amplifier 9 and an amplifier 10 (level converters 9 and 10).

CPU 11 controls printing of the image information sent from the image scanner 1 in accordance with the program stored in ROM 12. In other words, CPU 11 sends out an instruction to a driver 14 of a printer 13, thereby to print the image on the printing paper (not shown).

It is to be noted that reference numeral 15 represents RAM for memorizing the image information, and reference numeral 16 represents a group of indication switches. The group of indication switches includes a power supply switch.

The image information read out by the image scanner 1 is, through CPU 11, stored in RAM 15. Then, in order to print the image, CPU 11 sends out the image information stored in RAM 15 to the printer 13. On this occasion, since an unnecessary area in the read-out image information is set beforehand, the image information in the address of this unnecessary area is deleted. Then, CPU 11 processes the contents of the image information remaining in RAM 15 to send it to the printer 13.

For example, supposing that data with 120 mm length is going to be read out, the head of the read-out image information is stored in address OOOO of RAM 15, and so on. The last read-out image information is stored in address FFFF of RAM 15.

Figure 13:

In the case shown in FIG. 13, supposing that the unnecessary image information is about 3 mm long by 8 mm wide, such routine is included in the soft program that the last one having 3 mm length by 8 mm width among the image information stored in RAM 15 is deleted. In other words, it is so designed that the image information in the distance from the left end of the image scanner 1 to the portion which is being read out by the image scanner 1 is deleted.

In printing, after the image information once stored in RAM 15 is soft-processed in CPU 11, it is sent out to the printer 13. At this time, since the last image information of 3 mm length by 8 mm width in RAM 15 is arranged to be deleted, CPU 11 processes as if RAM 15 contains the image information only from address OOOO to address FF3F. Namely, it is so regarded that the image information from address FF4F to address FFFF has not been read out at all from the beginning, and the contents of RAM 15 is such without the image information from address FF4F to address FFFF. Accordingly, it will be the same thing as the unnecessary image information being deleted.

In the manner as described above, the image information stored in RAM 15 is cut off by 204 bytes from the last address, and printing is started.

Each of the indication switches 16a, 16b, 16c, 16d and 16e in the switch group 16 functions in the following manner.

Indication switch 16a . . . a power switch

Indication switch 16b . . . a paper transfer switch (to take out a printed paper)

Indication switch 16c . . . a graphic switch

Indication switch 16d . . . a layout switch

Indication switch 16e . . . a magnification switch (to magnify the printed contents twice as large as the original)

By operating the layer switch 16d, it is possible to change the printing position on the printing paper in accordance with the number of times of image reading.

It is to be noted here that the layout switch 16d is formed by a slide switch which is kept ON or OFF.

The image printing machine of the present invention is so constructed that the read-out information is printed at the left side and at the right side on the printing paper alternately with each other in accordance with the number of times of image reading.

Figure 3:
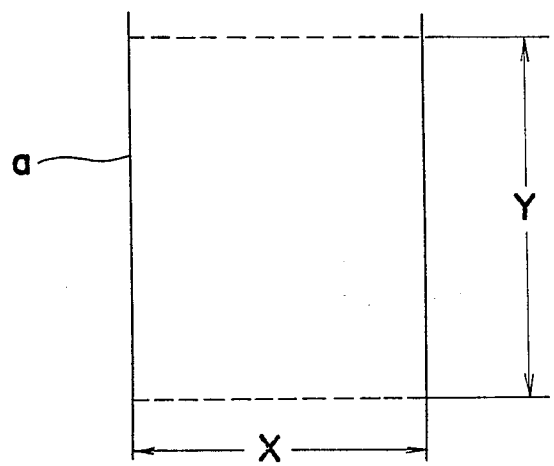
FIG. 3 is a view showing the size of a sheet of printing paper.

More specifically, when paper to be printed with an image has a width X of 80 mm as shown in FIG. 3, and when the image reading is at the time of an odd number (at the first time, at the third time, at the fifth time, . . . ), printing is started from the portion spaced 26 mm rightward from the left end a of the paper.

Accordingly, the image information is printed, in the case of image reading at the time of an odd number, over the width of 64 mm on the printing paper. On the other hand, the image information, in the case of image reading at the time of an even number, is printed over the width of 49 mm on the printing paper.

The above printing paper has a perforated line every 140 mm length Y. This is because the paper printed with the desired information is ready to be cut out.

Figure 4:
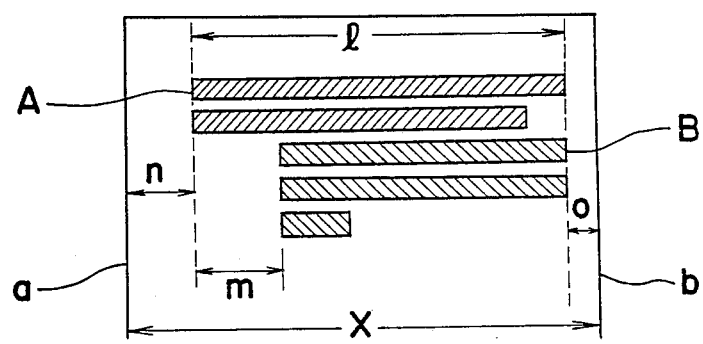
FIGS. 4 and 5 are views explanatory of the position of an image to be printed on the paper of FIG. 3.

The printed form by the image printing machine of the present invention is as shown in FIG. 4.

Referring to FIG. 4, the printing paper has a printable width l of 64 mm. The gap m between the printing position A corresponding to the case of image reading at the time of an odd number and the position B corresponding to the case of image reading at the time of an even number is 15 mm.

Further, the space n is 11 mm between the print start position in the case of image reading at the time of an odd number and, the left edge of the printing paper.

In FIG. 4, the printed contents at position A in the case of image reading at the time of an odd number extends to two lines. Moreover, the contents printed at position B in the case of image reading at the time of an even number extends to three lines, since the read-out image information is longer than the printable width l of the paper (that is, 64 mm in the case of the printed contents corresponding to image reading at the time of an odd number, and 49 mm in the case corresponding to the image reading at the time of an even number). Therefore, if the read-out image is shorter than the printable width, it is printed in one line.

In the image printing machine according to the present invention, the length of an image the image scanner 1 can read out at one time is set to be 120 mm at the largest, and accordingly, the image information read out at the time of an odd number never extends three lines, and also the image information read out at the time of an even number never exceeds four lines.

In the case where the image information read out at the time of an even number is shorter than 49 mm, that is, it can be printed in one line, the image information is printed in a manner to be drawn near to the right end of the paper. The space O between the position where the line is changed to a next line when the information to be printed extends line or the print finish position where the information, in the case of image reading at the time of an even number, is printed in a manner to be drawn near to the right end of the paper, and the right end b of the paper is set to be 5 mm.

Figure 5:
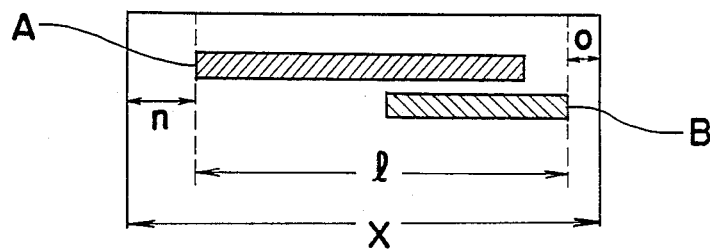

When the image A read out at the time of an odd number is shorter than 64 mm, and the image B read out at the time of an even number is shorter than 49 mm, the printed state is shown in FIG. 5. Each reference is equivalent to that described earlier.

Figure 6:
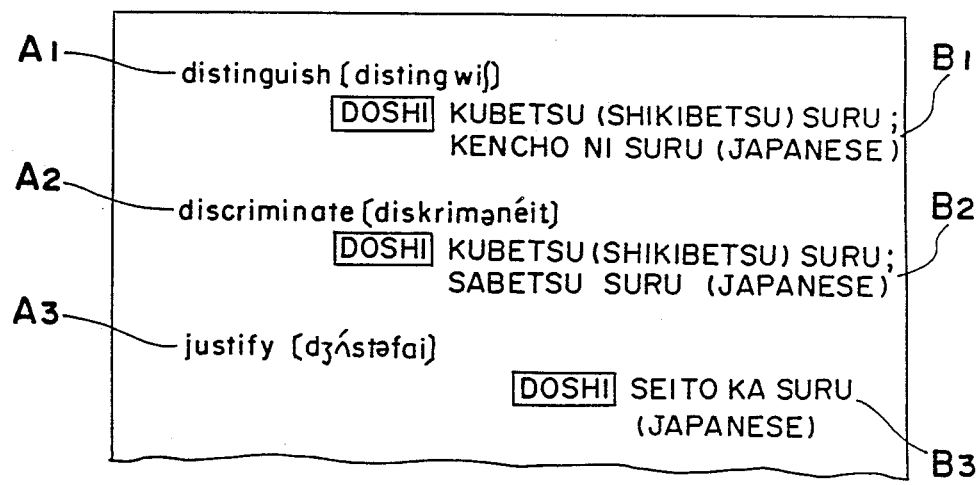
FIG. 6 is a view showing an example of actually printed image information.

FIG. 6 shows an example of a printed image. At the left side of the paper, image information A1, A2 and A3 respectively read out at the first, third and fifth times are printed. Also, at the right side of the paper, image information B1, B2 and B3 respectively read out at the second, fourth and sixth times are printed. The information A1, A2 and A3 are made up of words of phonetic symbols, while the information B1, B2 and B3 are composed of corresponding translated words and parts of speech. The information A1 and B1 correspond to each other, with A2 and B2, and A3 and B3 corresponding to each other. The information corresponding to each other are divided right and left on the paper to make a pair.

Next, the operation of the image printing machine according to the present invention will be explained.

Figure 7:
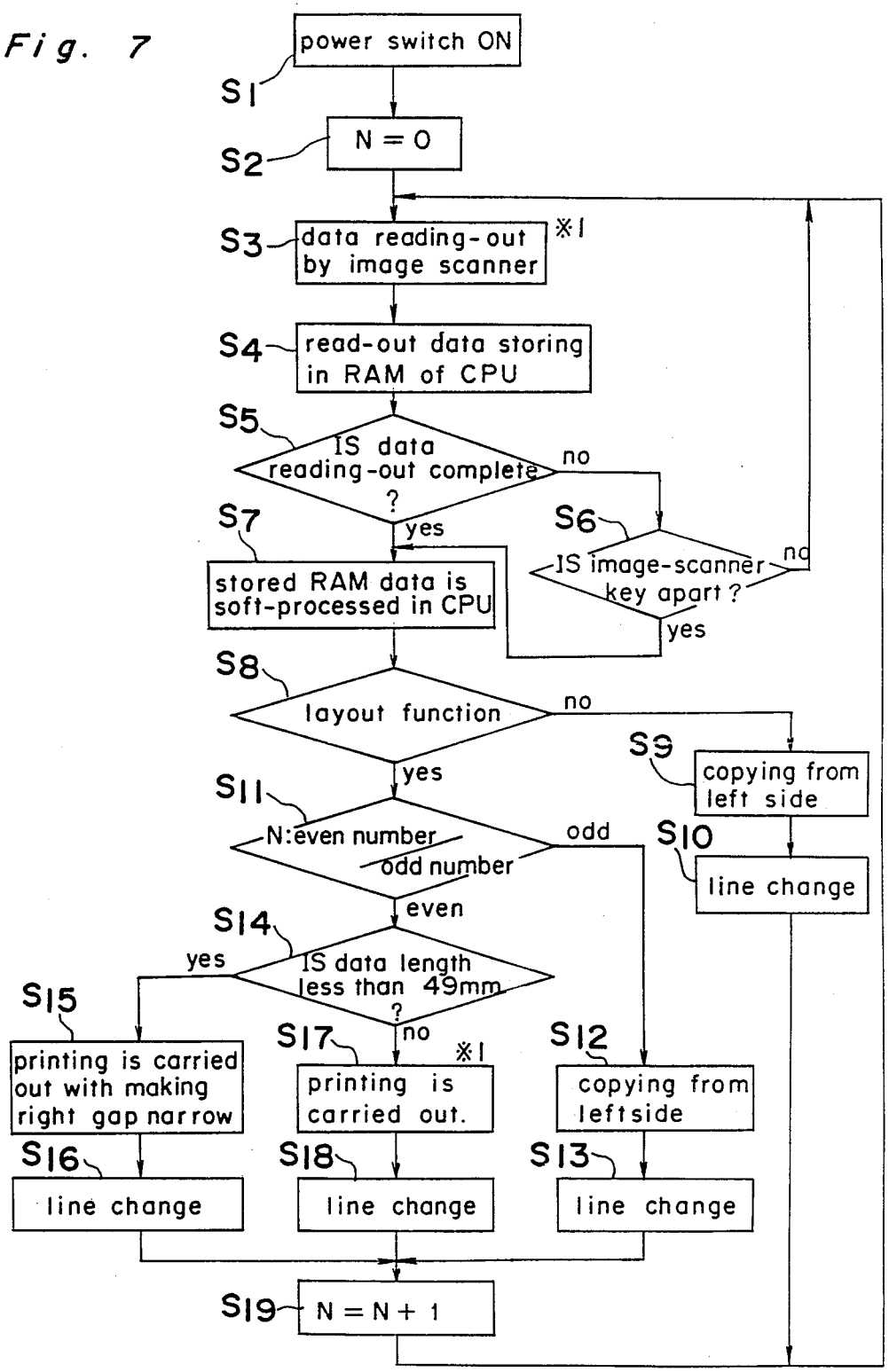
FIG. 7 is a flow-chart showing the operation of the machine of FIG. 1.
Figure 8:
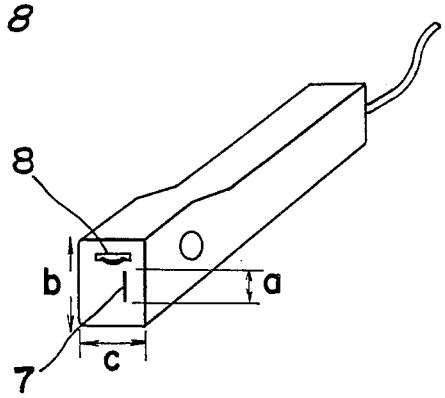
FIG. 8 is a perspective view of an image scanner.
Figure 10:
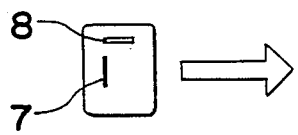
FIG. 10 is a view showing the direction of movement of the image scanner of FIG. 8.
Figure 11:
FIGS. 11 through 13 are views showing the positional relationship between the image scanner and characters to be read out by the image scanner.
Figure 12:

Referring to a flow-chart of FIG. 7, the power switch 16a of the switch body 16 is turned on to supply power in step S1. In step S2, a counter for calculating the number of times of image reading is cleared (the count value is turned to O). The counter is provided in RAM 15 (FIG. 2).

When the image scanner 1 is pressed against the surface of the paper, with the key 1a being operated, and moved in a direction to read out the information, the roller which is in contact with the paper is rotated, whereby a signal is sent out from the rotary encoder 8 to CPU 11 through the amplifier 10 (step S3).

CPU 9 turns the light source 6 on and off on the basis of the number of rotations of the roller which is detected by the rotary encoder 8. When the light source 6 is lighted, the element 7 detects light and shade of the paper so as to read in the image information by CPU 9 through the amplifier 9 (step S4).

The image information read into CPU 9 is stored in RAM 15 (step S4).

Reading of the image is completed under the condition that the image scanner 1 is stopped moving, or the key 1a is turned off, and the storing (memory) area of RAM 15 is completely filled with the image information. It is detected in steps S5 and S6 whether one of the aforementioned conditions is satisfied. If reading of the image is not completed, the flow returns to step S3.

When reading of the image is completed, the flow proceeds to step S7 where the read-out image information is soft-processed.

In step S8, with noting the fact that the layout switch 16d of the switch group 16 is turned off, printing is started from the left end of the printing paper, and the line is changed (step S10). Thereafter, the flow is returned to step S3. It is to be noted here that the left end of the printing paper referred to above indicates a position spaced n from the left end a of the paper shown in FIG. 4. Then, the flow is repeated.

On the contrary, if the layout switch 16d is turned on, the flow moves to step S11 in which it is detected whether the count value N of the counter is an odd number or an even number.

In the case where the count value N is an odd number, printing is done from the left end of the printing paper (step S12). After the line moves to another line (step S13), the count value N is increased 1 (step S19).

Meanwhile, when the count value N is found to be an even number in step S11, it is detected in step S14 whether the length of the image is less than 49 mm. If the length of the image is shorter than 49 mm, printing is carried out in a manner to draw near to the right end of the paper (step S15). Then, the line is advanced to a succeeding line (step S16), and thereafter, the count value N is increased 1 (step S19). On the other hand, if the image is longer than 49 mm, printing is started, with the distance 15 mm spaced from the head of the paper (at a position spaced n+m from the left end a of the paper shown in FIG. 4) (step S18). Thereafter, the count value N is increased 1 (step S19).

After the procedure in step S19 is finished, the flow returns to step S3.

In steps S9 and S12, if the image information is longer than the length of one line (64 mm), the line is changed to the next one. Moreover, also in step S17, if the image information is longer than the length of one line (49 mm), the line is changed to the next line. In any case, all the read-out information is fully printed.

For detecting whether or not the image is shorter than 49 mm in step S14, RAM 15 is provided with a subtract circuit for reducing 49 mm from the length of the image, so that the above detection can be carried out by finding out whether the result of the reduction by the subtract circuit is over O.

As is described above, the image printing machine of the present invention is so adapted that even if an unnecessary image is read out by the image scanner, the unnecessary image is not printed on the paper, and accordingly, only the desired image can conveniently be printed.

Furthermore, the image printing machine of the present invention is provided with a means to change the printing position on the paper in accordance with the number of times of image reading. Therefore, it becomes possible to arrange an English wordbook or a chronological table such that an English word or a date is printed on the left side of a paper, while its translated word or the historical event corresponding to the date is printed on the right side of the paper. Thus, it is advantageously convenient for high school students, etc. that, when arranging a note from the textbook or reference book, pairs of matters can be arranged plainly in an easy-to-see way.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An image printing machine comprising:
    an image scanner movable in a given direction for reading an image on a medium, said scanner having a head with a given width and a trailing edge at a rear side thereof with respect to the direction in which said scanner is moved, said scanner further having a read element for inputting the image, said read element having a width less than the width of said head and being positioned a distance from the trailing edge;
    printing means for printing a first portion of the image read by said read element; and
    means for deleting a second portion of the image read by said read element, said second portion corresponding to a width of the image approximately equal to the distance between said read element and said trailing edge and being a last part of said image read whereby said first portion printed by said printing means fails to include portions of said image read due to overlap of said head between said read element and said trailing edge.

2. The image printing machine as recited in claim 1, wherein said head further has a forward edge and at least two side edges between said forward edge and said trailing edge, said means for deleting only deleting that part of the image scanned by said head which is between said trailing edge and said read element at the end of a scanning.

3. The image printing machine as recited in claim 1, wherein said image scanner further includes a rotary encoder for contacting the medium and measuring a distance of movement of the scanner relative to the medium during scanning.

4. An image printing machine comprising:
    an image scanner for reading an image on a read medium, said image being arranged in lines on said read medium;
    printing means for printing the image scanned onto a receiving medium; and
    means for controlling said printing means to be in one of at least two modes, the printing means printing the image in lines on the receiving medium corresponding to the lines on said read medium in said first mode, the printing means indenting portions of the image printed on the receiving medium in said second mode, said portions which are indented corresponding to even numbered lines of the image on said read medium whereby the image printed on the receiving medium can be selectively indented.

5. The image printing machine as recited in claim 4, wherein said receiving medium has a given width, said machine further comprising means for determining whether an image to be printed on said receiving medium will fit thereon, when said printing means is in said second mode, said means for determining causes said printing means to print said image on said receiving medium ending at a right margin if there is sufficient space to accommodate said image in a single line and causes said printing means to print said image on said receiving medium in a plurality of lines which are all indented a predetermined amount if there is insufficient space to accommodate said image in a single line.

* * * * *